(12) United States Patent
Heggemann et al.

(10) Patent No.: US 9,692,080 B2
(45) Date of Patent: Jun. 27, 2017

(54) HEAD PLATE

(71) Applicant: WHITEFOX TECHNOLOGIES LIMITED, London (GB)

(72) Inventors: Robert Heggemann, Paderborn (DE); Rolf Siekaup, Paderborn (DE)

(73) Assignee: WHITEFOX TECHNOLOGIES LIMITED, London (GB)

( * ) Notice: Subject to any disclaimer, the term of this patent is extended or adjusted under 35 U.S.C. 154(b) by 0 days.

(21) Appl. No.: 14/483,945

(22) Filed: Sep. 11, 2014

(65) Prior Publication Data

US 2015/0093672 A1    Apr. 2, 2015

Related U.S. Application Data

(63) Continuation of application No. 12/087,501, filed as application No. PCT/DE2007/000020 on Jan. 5, 2007, now Pat. No. 8,834,717.

(30) Foreign Application Priority Data

Jan. 5, 2006 (DE) .......................... 10 2006 000 984

(51) Int. Cl.
*B01D 63/06* (2006.01)
*H01M 8/2485* (2016.01)
*H01M 8/0297* (2016.01)

(52) U.S. Cl.
CPC .......... *H01M 8/2485* (2013.01); *B01D 63/06* (2013.01); *H01M 8/0297* (2013.01); *B01D 2313/21* (2013.01); *Y02E 60/50* (2013.01)

(58) Field of Classification Search
CPC   H01M 8/0297; H01M 8/2485; B01D 63/021; B01D 63/022; B01D 63/023; B01D 63/06; B01D 63/061; B01D 2313/21
See application file for complete search history.

(56) References Cited

U.S. PATENT DOCUMENTS

| | | | | |
|---|---|---|---|---|
| 2,911,057 | A * | 11/1959 | Hill .......................... | C01B 3/501 96/8 |
| 2,961,062 | A * | 11/1960 | Hickey .................. | B01D 53/22 165/905 |
| 3,351,487 | A * | 11/1967 | Levine et al. ......... | B01D 63/02 427/115 |
| 3,870,637 | A * | 3/1975 | Miyoshi .................. | B01D 53/22 210/243 |
| 4,220,535 | A * | 9/1980 | Leonard .................. | B01D 53/22 210/321.89 |
| 4,323,454 | A * | 4/1982 | Fritzsche ................ | C08L 63/00 210/321.61 |
| 4,369,605 | A * | 1/1983 | Opersteny ............ | B01D 63/021 210/500.23 |
| 4,857,080 | A * | 8/1989 | Baker ................ | B01D 67/0072 427/250 |
| 4,961,760 | A | 10/1990 | Caskey et al. | |
| 6,547,286 | B1 | 4/2003 | White et al. | |

(Continued)

*Primary Examiner* — David C Mellon
(74) *Attorney, Agent, or Firm* — K&L Gates LLP

(57) ABSTRACT

The invention relates to a head plate, fixing the end of a tube bundle with a number of, in particular, porous tubes with a membrane in sealing manner. The head plate is made from a metal or a metal alloy with a melting point lower than the lowest failure temperature for a tube material and/or the membrane.

6 Claims, 1 Drawing Sheet

(56) References Cited

U.S. PATENT DOCUMENTS

Figure 1:
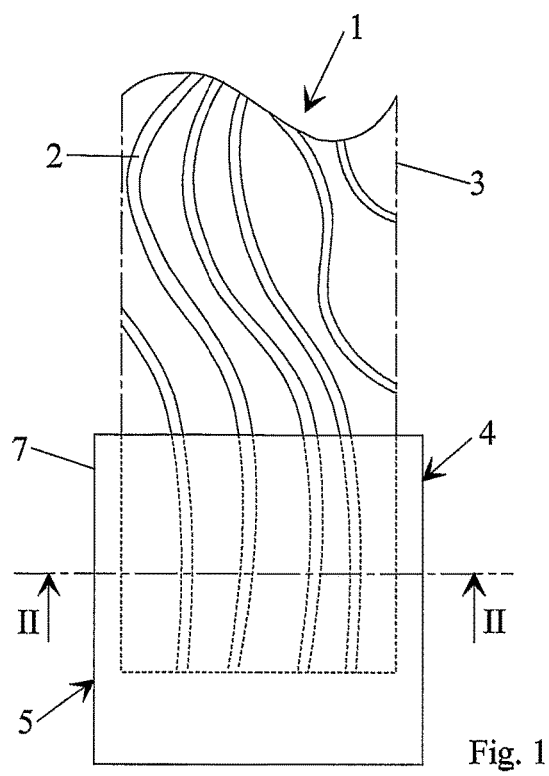

2002/0000404 A1* 1/2002 Mutsakis ............. B01D 63/061
210/323.2
2009/0246429 A1* 10/2009 Zaki ........................ C08K 3/08
428/35.8

* cited by examiner

HEAD PLATE

CROSS-REFERENCE TO RELATED APPLICATIONS

This application is a continuation of U.S. patent application Ser. No. 12/087,501 filed on Jul. 25, 2008, U.S. Pat. No. 8,834,717 issued on Sep. 16, 2014, claiming the benefit under 35 U.S.C. §371 to International Application No. PCT/DE2007/000020 filed Jan. 5, 2007, claiming priority to German Application No. 10 2006 000984.3 filed Jan. 5, 2006, to which priority is also claimed by the present application. The entire disclosures of said applications are incorporated by reference herein for all purposes.

BACKGROUND OF THE INVENTION

1. Field of the Invention

The invention relates to a head plate holding a tube bundle having a plurality of tubes with a membrane, in particular porous, at one end and sealing them tightly.

2. Description of the Related Art

Tubes of said type, e.g., tubes, capillaries or the like made of a plastic, a plastic composite, optionally also with a laminar structure, made of a ceramic or a metal have a variety of applications.

For example, in the case of fuel cells, a fuel component is conveyed in such tubes of a tube bundle, which is why such tubes designed as a microreactor are regularly also provided with a membrane by which the fuel components reacting with one another are separated.

Another area of application of such tube bundles is for refining fuels of biorenewable materials, e.g., bioethanol. Bioethanol flows through a tube designed as a semipermeable membrane and the water present in the bioethanol is removed through the membrane.

In such tube bundles, there is fundamentally the problem of holding and sealing the tubes at one end. So-called potting or gripping of the ends of these tube bundles together and in particular also for a sealing connection with a housing, a pipeline or the like is usually accomplished by synthetic resin, e.g. epoxy resins, casting techniques, although these are not without problems. For example, the different thermal expansion coefficients at a working temperature of up to 150° C. in low-temperature fuel cells and/or up to 250° C. in medium-temperature fuel cells lead to substantial thermal burdens, which can lead to more cracks, leakage and the like in the area of the head plate, which usually results in failure of the entire apparatus.

SUMMARY OF THE INVENTION

Against this technical background, one object of the present invention is to make available a head plate which can be designed to withstand higher mechanical loads, to securely grip the individual tubes of the tube bundle and to hold them with a seal.

It has surprisingly been found that these technical problems are solved by a head plate in which the emphasis is on the head plate being made of a metal or a metallic alloy of a lower melting point than the failure temperature of the tube material and/or the membrane.

Low-melting metals, solders or mechanical alloys are usually extremely brittle and coarse-grained after solidification of their melts. This is regularly associated with a great mechanical instability. Therefore, such materials are usually not suited for gripping the individual tubes of a tube bundle, in particular those of a small diameter, and sealing them tightly.

Nevertheless, the present invention makes available such metals and/or metallic alloys of a low melting point. This is also true in particular with regard to the wide range of variation in diameters of the tubes of the tube bundle, said diameters often varying from less than 1 mm up to the centimeter range.

With the choice of the metal or the metallic alloy, its melting point, which of course must be lower than the failure temperature of the tube of material and/or that of the membrane but on the other hand is higher than the operating temperature of a finished device, should be taken into account. This can often be achieved if the melting point is between 100° C., in particular 120° C., and 250° C.

The preferred metal for use is bismuth, chemical symbol Bi, or contains the alloy bismuth.

Bismuth is a reddish white, shiny and moderately hard heavy metal. Like water, bismuth contracts in volume on melting and expands by 3.32% on solidification. Consequently, on cooling, bismuth and melts containing bismuth are excellent for penetrating into even the tiniest interspaces between the tubes of a tube bundle. In addition, bismuth has a very high chemical stability. For example, it is insoluble in nonoxidizing acids.

However, the melting point of pure bismuth is 271.3° C., which is too high for many applications. It is therefore preferable to use a bismuth alloy whose melting point can be lowered significantly when such a solution contains approximately 14% to 60% bismuth, 20% to 30% lead or up to 45% tin or antimony, cadmium, indium, zinc, tellurium, mercury or thallium.

With the applications mentioned in the introduction, however, it is preferable for the alloy or the metal to be lead-free in particular.

A preferred alloy is a eutectic bismuth-tin alloy which has a melting point of 138° C. and a density of 8.58 g/cm$^3$.

The metals of a eutectic alloy are advantageously completely miscible in a molten state, and the melt solidifies in the form of a pure substance at a uniform temperature. On solidification, the components separate and crystallize side-by-side in an extremely fine crystalline form, the eutectic structure. It is also advantageous that a eutectic has the lowest solidification point or melting point that is possible in the substance system in question, referred to as the eutectic temperature or eutectic point respectively in the melting diagram.

A tube material will usually be a plastic, in particular a polymer, whereby the idea is in particular that a membrane may also be a polymer membrane. The failure temperature at which there is no longer any functionality of the tube and/or membrane is often slightly less than 200° C., so that such a polymer tube and/or such a polymer membrane will definitely not be damaged by the metal melt and/or the melt of the alloy.

Alternatively, a tube, in particular porous, may be made of a ceramic and/or a metal, in particular a sintered metal. Such tubes are most suitable for being provided with a layer of zeolite which forms a membrane. On the basis of their crystalline pore structure, such membrane layers are suitable for size-selective and shape-selective separation of liquid and gaseous substance mixtures. In addition, the hydrophilic/hydrophobic hydrophobic character can be adjusted through the choice of the Si/Al ratio in the zeolite crystal. Thus a hydrophobic zeolite membrane can be made available for a selective separation of organic solvents such as ethanol from water, with the help of pervaporation at approximately 100° C.

In the case of tubes with a small diameter in particular, they may be bundled chaotically and in contact with one another, e.g., for refining bioethanol. Nevertheless, due to the special properties of bismuth in particular, the tubes are held securely and with a seal. However, for the sake of safety, the axial length of a casting should be designed to be longer than the diameter of an enveloping curve of a tube bundle. Then the individual tubes may be encased with a seal everywhere over the axial length.

As an alternative, of course, the tubes of a tube bundle may also be aligned at a distance from a predefinable grid, as is customary with fuel cells, for example.

Figure 2:
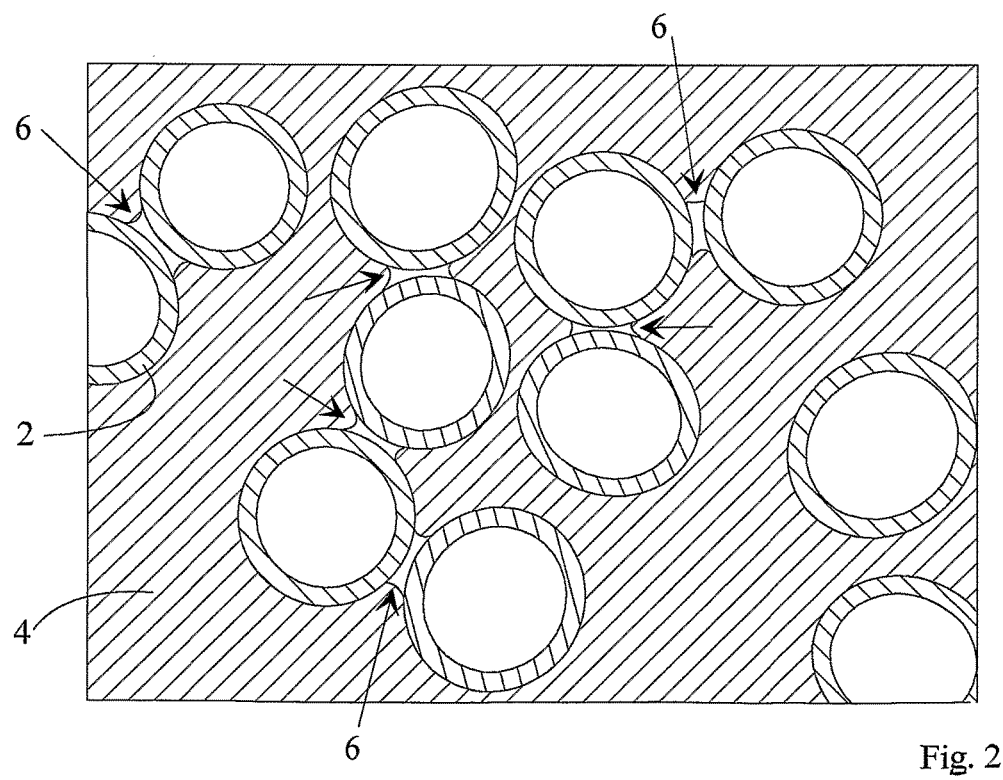

The invention will now be explained in greater detail on the basis of the drawings, in which exemplary embodiments are depicted schematically. The drawings show:

FIG. 1: a lateral view of a casting of the tube ends of tubes of a tube bundle, and FIG. 2: an enlarged detail along line II, II in FIG. 1.

DETAILED DESCRIPTION OF THE EMBODIMENTS

FIG. 1 shows a tube bundle 1 with a plurality of tubes 2 shown from the side, e.g., polymer membranes with an outside diameter of approximately 0.5 mm. The tubes 2 are chaotically bundled and are touching one another. The outside contour of the tube bundle 1 is therefore merely indicated by a dash-dot enveloping curve 3. It is nevertheless possible to form a metallic head plate 4, which holds the individual tubes 2 at one end among one another and with respect to a housing, for example, and does so reliably and with a seal (see also FIG. 2).

To do so, a metal or a metallic alloy of the type defined in the introduction is liquefied in a suitable pot shape and the tube bundle 1 is immersed in the melt at one end. The tubes 2 may be sealed to one another at one end in a known manner. However, this is not usually necessary with tubes 2 having a small inside diameter, because the molten metal and/or the molten alloy penetrates axially into a tube 2 only to a slight extent.

To ensure that all the interspaces of the axial length of the head plate 4 are also sealed, the axial extent of a casting 5 is usually designed to be greater than its diameter and/or than the enveloping curve 3.

The head plate 4 is manufactured by a cut, e.g., along line II, II, by means of which the tube ends are then exposed.

FIG. 2 shows a subsequently diagramed polished section of such a cut on an enlarged scale. Larger interspaces between the individual tubes 2 are homogeneously sealed by a metal or a metallic alloy according to the invention with extremely fine pores and homogeneously in this enlarged diagram. If tubes 2 are extremely close to one another, or are in contact, there remains a slight space 6 (see arrows 6) between the tubes 2. However, these spaces are reliably sealed over the axial length of the casting 5 and/or the head plate 4.

After appropriate machining of the lateral radial surface 7 of the head plate 4, the tube bundle 1 is then gripped with a seal and held at one end for a further application.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of forming a head plate assembly comprising:
   chaotically bundling a plurality of polymeric membrane tubes in a non-parallel manner to form a tube bundle extending along an axial length defining an external contour;
   forming a head plate with a metal or a metallic-alloy having a melting point over 100° C. so that the head plate has an axial length longer than a diameter of an enveloping curve of the external contour of the tube bundle;
   gripping a polymeric membrane surface of ends of the plurality of polymeric membrane tubes of the tube bundle with a metal or metallic alloy surface of the head plate; and
   encasing the plurality of polymeric membrane tubes within the head plate over the axial length of the head plate.

2. The method of claim 1, which includes immersing the tube bundle in the head plate while the metal or metallic-alloy of the head plate is in liquid form.

3. The method of claim 1, wherein forming the head plate includes casting the head plate around the ends of the plurality of polymeric membrane tubes.

4. The method of claim 1, which includes sealing all interspaces between the plurality of polymeric membrane tubes with the head plate.

5. The method of claim 1, which includes cutting a portion of the head plate so that the ends of the plurality of polymeric membrane tubes are exposed.

6. The method of claim 5, which includes polishing the head plate at a cut portion of the head plate.

* * * * *